Figure 1:
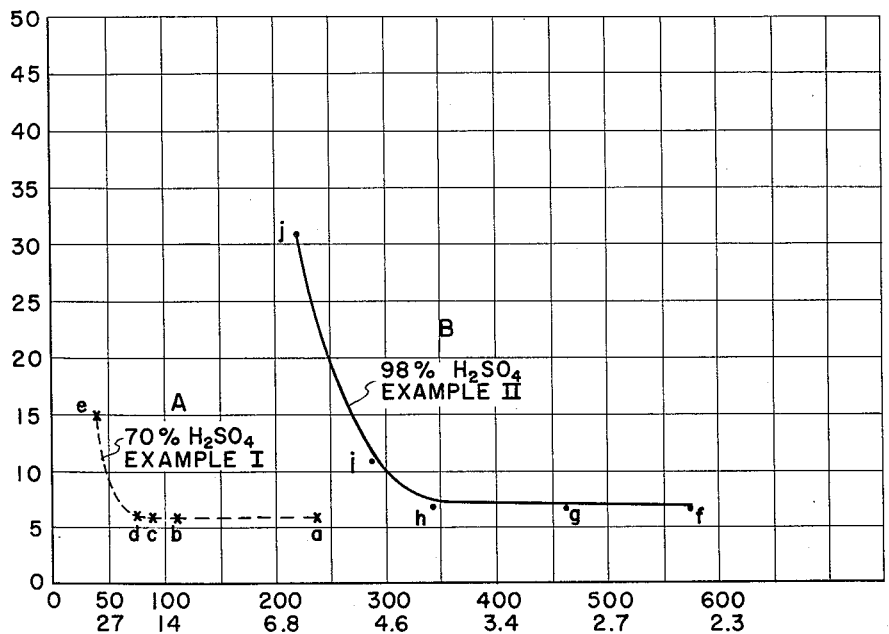

INVENTORS:
WEIGERT C. BUNINGH
CORNELIS D. TEN HAVE
THEIR ATTORNEY

# United States Patent Office 2,999,807
Patented Sept. 12, 1961

2,999,807
REMOVAL OF NITROGEN COMPOUNDS FROM GASOLINE
Weigert C. Buningh, Amsterdam, and Cornelis D. Ten Have, Rotterdam, Netherlands, assignors to Shell Oil Company, New York, N.Y., a corporation of Delaware
Filed Oct. 23, 1959, Ser. No. 848,384
Claims priority, application Netherlands Mar. 31, 1959
2 Claims. (Cl. 208—254)

This invention relates to an improved process employing sulfuric acid for the removal of nitrogen-containing compounds from hydrocarbon mixtures, and particularly mixtures containing unsaturated hydrocarbons, e.g. catalytically cracked gasoline.

It has been known for a long time to treat liquid petroleum products with sulfuric acid to completely or partly remove the sulfur and nitrogen compounds present therein. The chemical reactions involved are extremely complex and the result of the treatment depends on the quantity of acid used, the manner in which the sulfuric acid is added to the petroleum product to be treated, the concentration of the sulfuric acid, the treating temperature, the contact time, the manner in which the liquid to be treated and the sulfuric acid are contacted and the manner in which the sulfuric acid and the reaction products formed are removed from the liquid petroleum product. The choice of the conditions under which the liquid petroleum products are treated with sulfuric acid depends on the composition of the liquid to be treated.

Petroleum distillates obtained by cracking contain unsaturated hydrocarbons, i.e. the olefinic materials. When treating such petroleum distillates with sulfuric acid there is a grave risk of the unsaturated hydrocarbons present being polymerized to resinous materials. At one time in petroleum processing a primary object of the sulfuric acid treatment of petroleum distillates containing unsaturated hydrocarbons, such as cracked gasoline, was the complete or partial removal of the unsaturated hydrocarbons since it was desired to obtain a product containing the minimum of components which were likely to be converted into undesirable resinous material during storage or use of the product. Resinous materials tend to clog engine supply lines. Removal of the unsaturated hydrocarbons from petroleum distillates has, however, several disadvantages. In the first place removal of unsaturated hydrocarbons involves a substantial loss of treated product. The octane number of the gasoline is also reduced as a result of the removal of these hydrocarbons. Because of these disadvantages and since it is possible to prevent or at least considerably reduce resin formation without resorting to olefin removal by addition of certain antioxidants, attempts have been made to minimize the polymerization of the olefins during sulfuric acid treatment of petroleum distillates containing these materials.

To this end it has been proposed to use dilute sulfuric acid. In an article found in The Science of Petroleum Vol. III, page 1773, for instance, a sulfuric acid concentration of 40% is specified. The use of dilute sulfuric acid, has, however, the drawback that the sulfuric acid has a corrosive effect on steel, so that the treatment cannot be carried out in the conventional steel equipment without rendering it useless in a short time. Hence, when dilute sulfuric acid is used it is desirable to utilize equipment resistant to the corrosive effect of the sulfuric acid. Since this equipment is fairly expensive and polymerization could not be completely suppressed, after all, attempts have been made to solve the difficulties by adopting a different procedure.

It has been proposed in The Science of Petroleum, Vol. III, page 1773, to subject petroleum distillates to sulfuric acid counter-current treatment. Since the sulfuric acid is diluted during the treatment, it may be supplied to the treating plant in a higher concentration than with the use of a process in which the petroleum distillates are batchwise contacted with the sulfuric acid.

U.S. Patent 2,155,007 describes a process in which a petroleum fraction is passed in countercurrent flow to concentrated sulfuric acid or a dispersion consisting of concentrated sulfuric acid and oil through a tower filled with a solid inert material having a hydrophilic surface to completely or partly remove the sulfur and polymerizable components present in the petroleum fraction. Polymerization of any unsaturated hydrocarbons present in the petroleum fraction to be treated is therefore not prevented by this process; in fact the object of said process is to remove these hydrocarbons by polymerization from the petroleum fraction to be treated.

In the Refiner, Vol. 13, pages 125–131 (1934) an installation is described comprising several stages, each having a high-speed stirred mixer communicating with a centrifuge. A petroleum distillate containing the unsaturated hydrocarbons is passed through the installation in countercurrent flow to concentrated sulfuric acid to remove the sulfur present. The liquids are intimately contacted in the mixers by intense stirring and then led to the centrifuges where they are immediately separated. This arrangement is said to desulfurize the oil without excessive polymerization but the capital investment is large and the energy requirement is a considerable item in the practice of the process.

It is an object of this invention to provide a process permitting the removal of nitrogen compounds from an olefin containing hydrocarbon mixture with a minimum of polymerization, with a small energy requirement and with a minimum of capital outlay. This and other objects will become more apparent in the following description, taken in conjunction with the drawings, wherein the two figures present the data of the four examples in graph form.

It has now been discovered that it is possible to utilize a highly concentrated sulfuric acid in a bed of solid, inert material having a hydrophilic surface to remove nitrogen compounds from a hydrocarbon mixture without the polymerization or condensation of the unsaturated olefinic materials occurring. The use of such a bed is especially attractive as it permits nitrogen compound removal with a minimum amount of energy being supplied. According to the invention the hydrocarbon mixture and a sulfuric acid of at least 65% concentration are passed downwardly over the hydrophilic surface of the contact bed in concurrent flow, with the ratio by volume of the sulfuric acid to the hydrocarbon being less than 1. The contact time employed is selected with reference to the sulfuric acid concentration to substantially forestall polymerization of the unsaturated hydrocarbons. In any event the contact time is less than 30 seconds, even with a more dilute acid. In the case of a 98% concentrated acid, the recommended maximum contact time is about 8 seconds, while for a 70% concentrated acid the comparable contact time is about 25 seconds. The permissible maximum contact time for acids of other concentrations is selected with reference to the foregoing times for the two designated acids. There is an approximate linear relationship between acid concentration and contact time, with the more concentrated acids requiring shorter contact times. Less concentrated acids may use proportionally longer contact times without the occurrence of undue amounts of polymerization. Both liquids leave the contact bed as continuous phases, thus further minimizing the time of contact of the two phases and whereby reducing polymerization of the olefinic material. The process of the present application is related to the process of the copending application Serial No. 825,778, filed July 8, 1959 (Weigert C. Buningh) which is directed to the continuous treatment of immiscible liquids in a solid, inert material contact bed and to their removal from that bed in continuous and separate phases.

The term contact time is used herein to describe the time during which the hydrocarbon mixture undergoing treatment is in contact within the contact bed with the treating sulfuric acid. The contact time is calculated by dividing the free volume of the bed, expressed in liters, by the quantity of the hydrocarbon mixtures undergoing treatment expressed in liters, which is passed through the contact bed per a second. The content of resinous components in the hydrocarbon mixture is determined by the I.P. 38 method described in "Standard Methods for Testing Petroleum and Its Products," published by the Institute of Petroleum, 16th Edition, page 237.

The process of the invention is useful for treating various types of petroleum fractions containing unsaturated hydrocarbons, for instance, gasoline obtained by thermal or catalytic cracking or by thermal reforming. Particularly suitable gasolines for treatment in the process have an ASTM boiling range of from 40 to 205° C. or from 110 to 210° C. The process may be applied to oils obtained from oil-containing shales through heating. Nitrogen compounds may also be removed through use of the process from distillation products, for instance, crude benzenes obtained in the working up of tar.

The contact time between the hydrocarbon mixture and the sulfuric acid must be carefully related to the sulfuric acid concentration to avoid excessive polymerization of the olefin content of the hydrocarbon mixture. The rate of polymerization may be considered generally to increase linearly with an increase in sulfuric acid concentration. In the instance of a 70% sulfuric acid concentration, the time of contact should preferably not exceed a time interval of 23 to 26 seconds. A generally safe maximum contact time for 70% sulfuric with a minimum objectionable amount of polymerization is about 25 seconds. The exact time will be governed by the permissible amount of polymerization that may be tolerated. For a 98% concentrated sulfuric acid, polymerization will generally occur to some extent if the time of contact is in excess of 4 to 10 seconds. A generally safe maximum contact time for 98% acid is about 8 seconds. Even with the less concentrated acid, it is recommended that the contact time not exceed 30 seconds. For a 65% concentrated acid the contact time is preferably less than 28 seconds.

According to the invention the contact bed should consist of inert material, by which is meant that the material should not react with the liquids to be passed through, with components present therein or with the reaction products which may or may not form when the two liquids are contacted. The surface of the contact bed should be hydrophilic, so that it preferentially wetted by the sulfuric acid during the treatment. The sulfuric acid is thereby retained on the surface of the contact bed and in this way a large contact surface is formed. Examples of contact material suitable for use in carrying out the process according to the invention are ceramic materials, coke pretreated with an organic solvent, glass, pumice and ion-exchange resin such as one of the sulfonated polystyrene type. The contact material may have the form of Raschig rings, Berl saddles, Dixon packing, beads or fibers. The particle size of the contact material may vary from 0.1 mm. to 30 mm.

It is desirable for the contact surface of the liquids to be as large as possible. The use of a contact bed consisting of particles having an average size of from 0.1 mm. to 0.5 mm. ensures that this contact surface per unit of volume of the contact material is very large. If, however, the liquid to be treated contains solid contaminations, clogging of the contact bed could not always be avoided. If the particles of the contact bed are larger than 10 mm. the contact surface of the liquids is relatively small. A contact material having an average particle size of 0.5–10 mm. is preferably used. The contact bed may consist of particles of about equal size. Although it may also consist of layers each of which is formed by particles of about the same size, but in which the particles of the layers differ in size from layer to layer.

It is important to avoid the formation of a dispersion in the contact bed, especially at the discharge side of the bed. Hence, the quantities in which the two liquids are supplied to the contact bed per unit of time and the direction of flow of the two liquids through the contact bed are preferably such that both liquids leave the contact bed as continuous phases.

In the process according to the present invention it is required that the two liquids leave the contact bed as continuous phases. For this purpose it is essential that the two liquids flow through the contact bed as substantially continuous phases, and this is realized by flowing the treating liquid in the form of a coherent layer (film) over the surface of the contact particles with the liquid undergoing treatment being passed through the interstices between the particles covered with treating liquid, there being no or substantially no dispersion of one liquid in the other. As a consequence of the two liquids being present as two continuous phases in the contact bed, they are still present as continuous phases at the moment that they leave the contact bed. It is only at that moment that droplets may form (usually of the treating liquid in the treated liquid) and substantially all droplets thus formed from the continuous phases present at the exit of the contact bed have such large diameters that their velocity of fall is distinctly higher than the velocity of the liquid mixture immediately after leaving the contact bed. This difference in velocities allows a very rapid and substantially complete separation of the two liquids under the mere influence of gravitational forces without the use of expensive separator devices, resulting in two liquids that on visual inspection are entirely clear and free from haze and turbidity.

The downward passage of the two liquids through the contact bed assures that the two liquids leave the contact bed as continuous phases. Should the two liquids be passed upwardly through the contact bed, the sulfuric acid, which has a higher specific gravity than the hydrocarbon undergoing treatment, tends to accumulate in the lower part of the contact bed and this considerably promotes the tendency towards the formation of dispersions. The formation of dispersions is particularly to be avoided in the present process since this will lead to excessive polymerization of the olefinic portion of the hydrocarbon mixture. For a more complete discussion of dispersion formation, reference is made to copending application Serial No. 825,778, filed July 8, 1959 (Weigert C. Buningh), for further information in this regard.

When the above procedure is adopted, neither of the liquids entrains traces of the other and a ready and complete separation of the two liquids flowing from the contact bed can be immediately effected. Separating equipment such as centrifuges which are not only expensive but also require much energy can be dispensed with.

The surface of the contact material may be wholly or partly wetted by the sulfuric acid. If part of the surface were wetted with the sulfuric acid, the contact surface of the liquids would be smaller than if the entire surface of the contact bed were wetted by the treating liquid. It is therefore clear that it is advisable to wet the entire surface of the contact bed with the sulfuric acid and to keep it wetted. A convenient expedient comprises wetting the contact bed in advance with the sulfuric acid and spreading the latter as uniformly as possible over the entire surface of the contact material during operation. In order to wet part of the contact bed or the entire contact bed and to keep it wetted the quantity of sulfuric acid supplied to the contact bed per unit of time should not fall below a minimum. This minimum depends on various factors such as the nature of the contact bed material and the viscosity of the sulfuric acid.

EXAMPLE I

A column having a capacity of 7 parts by volume, the diameter/height ratio being 1.1:7, was packed with glass beads of 1 mm. diameter. The volume of the voids of this packing was 2.8 parts by volume. Sulfuric acid of 70% concentration was continuously passed downwardly over the hydrophilic surface of this inert contact material at a rate of 3.2 parts by volume per hour. Cracked gasoline having an ASTM boiling range of from 40° C. to 205° C., a nitrogen compound content of 2.3 m. eq./l. and a resinous component content of 6 mg./100 ml., measured by the I.P. 38 method was supplied in downward flow to this sulfuric acid wetted contact bed at various rates. The results are summarized in Table I.

*Table I*

| Tests | Throughput of the cracked gasoline in parts by volume/hour | Liquid hourly space velocity of the cracked gasoline, based on the total volume of the contact bed | Contact time in seconds | Content of nitrogen compounds in the cracked gasoline after treatment, in m. eq./l. | Content of resinous components in the cracked gasoline after treatment (I.P. 38), in mg./100 ml. |
|---|---|---|---|---|---|
| a | 1,645 | 235 | 6 | <0.2 | 6 |
| b | 784 | 112 | 13 | <0.2 | 6 |
| c | 630 | 90 | 16 | <0.2 | 6 |
| d | 441 | 63 | 23 | <0.2 | 6 |
| e | 280 | 40 | 36 | <0.2 | 15 |

Figure 1 shows the above results in the form of a graph as line A. The liquid hourly space velocity of the cracked gasoline, based on the total volume of the contact bed, and below it the corresponding contact time in seconds is plotted on the horizontal axis and the content of resinous components in the cracked gasoline in mg. per 100 ml., measured according to I.P. 38, on the vertical axis.

EXAMPLE II

Sulfuric acid of 98% concentration was continuously fed at a rate of 3.2 parts by volume per hour into a column having the same dimensions and the same packing (the volume of the voids of the packing was 2.8 parts by volume) as indicated in Example I. Cracked gasoline having an ASTM boiling range of from 40° C. to 205° C., a nitrogen compound content of 2.3 m. eq./l. and a resinous component content of 6 mg. per 100 ml., measured by the I.P. 38 method, was supplied to the sulfuric acid wetted contact bed at various rates. The acid and gasoline passed concurrently in downward flow through the column. The results are summarized in Table II.

*Table II*

| Tests | Throughput of the cracked gasoline in parts by volume/hour | Liquid hourly space velocity of the cracked gasoline, based on the total volume of the contact bed | Contact time in seconds | Content of nitrogen compounds in the cracked gasoline after treatment, in m. eq./l. | Content of resinous components in the cracked gasoline after treatment (I.P. 38), in mg./100 ml. |
|---|---|---|---|---|---|
| f | 4,025 | 575 | 2.5 | 0.2 | 7 |
| g | 3,255 | 465 | 3.1 | <0.2 | 7 |
| h | 2,415 | 345 | 4.2 | <0.2 | 7 |
| i | 2,030 | 290 | 5.0 | <0.2 | 11 |
| j | 1,540 | 220 | 6.5 | <0.2 | 31 |

FIGURE 1 shows the above results in the form of a graph as line B.

EXAMPLE III

Sulfuric acid of 70% concentration was continuously fed at a rate of 3.2 parts by volume per hour into a column having the same dimensions and the same packing (the volume of the voids of the packing was 2.8 parts by volume) as indicated in Example I. Cracked gasoline having an ASTM boiling range of from 110° C. to 210° C., a nitrogen compound content of 2.5 m. eq./l. and a resinous component content of 2 mg. per 100 ml., measured by the I.P. 38 method, was supplied to the sulfuric acid-wetted contact bed at various rates. The results are summarized in Table III. The gasoline and sulfuric acid were passed in concurrent flow downwardly over the packing of the column.

*Table III*

| Tests | Throughput of the cracked gasoline in parts by volume/hour | Liquid hourly space velocity of the cracked gasoline, based on the total volume of the contact bed | Contact time in seconds | Content of nitrogen compounds in the cracked gasoline after treatment, in m. eq./l. | Content of resinous components in the cracked gasoline after treatment (I.P. 38), in mg./100 ml. |
|---|---|---|---|---|---|
| k | 1,400 | 200 | 7.1 | 0.2 | 3 |
| l | 770 | 110 | 13 | 0.2 | 3 |
| m | 420 | 60 | 24 | 0.2 | 3 |
| n | 210 | 30 | 48 | 0.2 | 9 |

Figure 2:
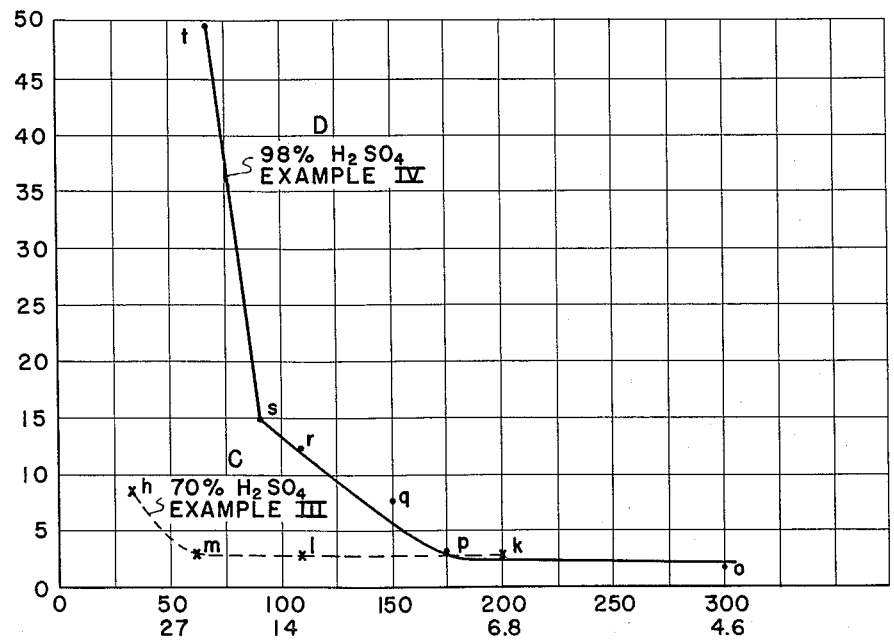

FIGURE 2 shows the above results in the form of a graph as line C. As in FIGURE 1, the liquid hourly space velocity of the cracked gasoline, based on the total volume of the contact bed, and below it the corresponding contact time in seconds is plotted on the horizontal axis of FIGURE 2, and the content of resinous components in the cracked gasoline in mg. per 100 ml., measured by the I.P. 38 method, on the vertical axis.

EXAMPLE IV

Sulfuric acid of 98% concentration was continuously fed at a rate of 3.2 parts by volume per hour into a column having the same dimensions and the same packing (the volume of the voids of the packing was 2.8 parts by volume) as indicated in Example I. Cracked gasoline having an ASTM boiling range of from 110° C. to 210° C., a nitrogen compound content of 2.5 m. eq./l. and a resinous component content of 2 mg. per 10 ml., measured by the I.P. 38 method was supplied to the sulfuric acid-wetted contact bed at various rates. The results are summarized in Table IV. The gasoline and sulfuric acid passed in concurrent flow downwardly over the packings of the column.

*Table IV*

| Tests | Throughput of the cracked gasoline in parts by volume/hour | Liquid hourly space velocity of the cracked gasoline, based on the total volume of the contact bed | Contact time in seconds | Content of nitrogen compounds in the cracked gasoline after treatment, in m. eq./l. | Content of resinous components in the cracked gasoline after treatment (I.P. 38), in mg./100 ml. |
|---|---|---|---|---|---|
| o | 2,100 | 300 | 4.8 | <0.2 | 2 |
| p | 1,225 | 175 | 8.2 | <0.2 | 3 |
| q | 1,050 | 150 | 9.6 | <0.2 | 8 |
| r | 770 | 110 | 13 | <0.2 | 12 |
| s | 630 | 90 | 16 | <0.2 | 15 |
| t | 420 | 60 | 24 | <0.2 | 78 |

FIGURE 2 shows the above results in the form of a graph.

We claim as our invention:

1. A process for the removal of nitrogen compounds from a liquid mixture of hydrocarbons containing unsaturated hydrocarbons and boiling in the gasoline range comprising passing the hydrocarbon mixture in downward and concurrent flow with sulfuric acid of at least 65% concentration over a hydrophilic surface of a contact bed of solid, inert material, with the ratio by volume of the sulfuric acid to the hydrocarbon being less than one and with the contact time being selected with reference to the sulfuric acid concentration to substantially forestall polymerization of the unsaturated hydrocarbon, said contact time being less than 30 seconds, and removing the sulfuric acid and the hydrocarbon mixture as continuous phases from the bed, the proportion of acid to nitrogen compounds being such that no more than about 15% of the sulfuric acid is consumed during the contact.

2. A process for the removal of nitrogen compounds from a liquid mixture of hydrocarbons containing unsaturated hydrocarbons and boiling in the gasoline range comprising passing the hydrocarbon mixture in downward and concurrent flow with sulfuric acid of at least 65% concentration over a hydrophilic surface of a contact bed of solid, inert material, with the ratio by volume of the sulfuric acid to the hydrocarbon being less than one and with the contact time being selected with reference to the sulfuric acid concentration to substantially forestall polymerization of the unsaturated hydrocarbon, said contact time being less than 30 seconds, with a maximum contact time of about 8 seconds for 98% concentrated acid and a maximum contact time of about 25 seconds for 70% concentrated acid and with the contact times of other concentrated acids being selected linearly with reference to the foregoing times for the two designated acids, and removing the sulfuric acid and the hydrocarbon mixture as continuous phases from the bed, the proportion of acid to nitrogen compounds being such that no more than about 15% of the sulfuric acid is consumed during the contact.

References Cited in the file of this patent

UNITED STATES PATENTS

| | | |
|---|---|---|
| 1,635,718 | Leaver | July 12, 1927 |
| 1,769,766 | Bryant | July 1, 1930 |
| 1,985,717 | Campbell | Dec. 25, 1934 |
| 2,001,909 | Ipatieff | May 21, 1935 |